June 16, 1942.  F. J. HOOVEN  2,286,804
RADIO COMPASS
Filed Feb. 24, 1940  2 Sheets-Sheet 1
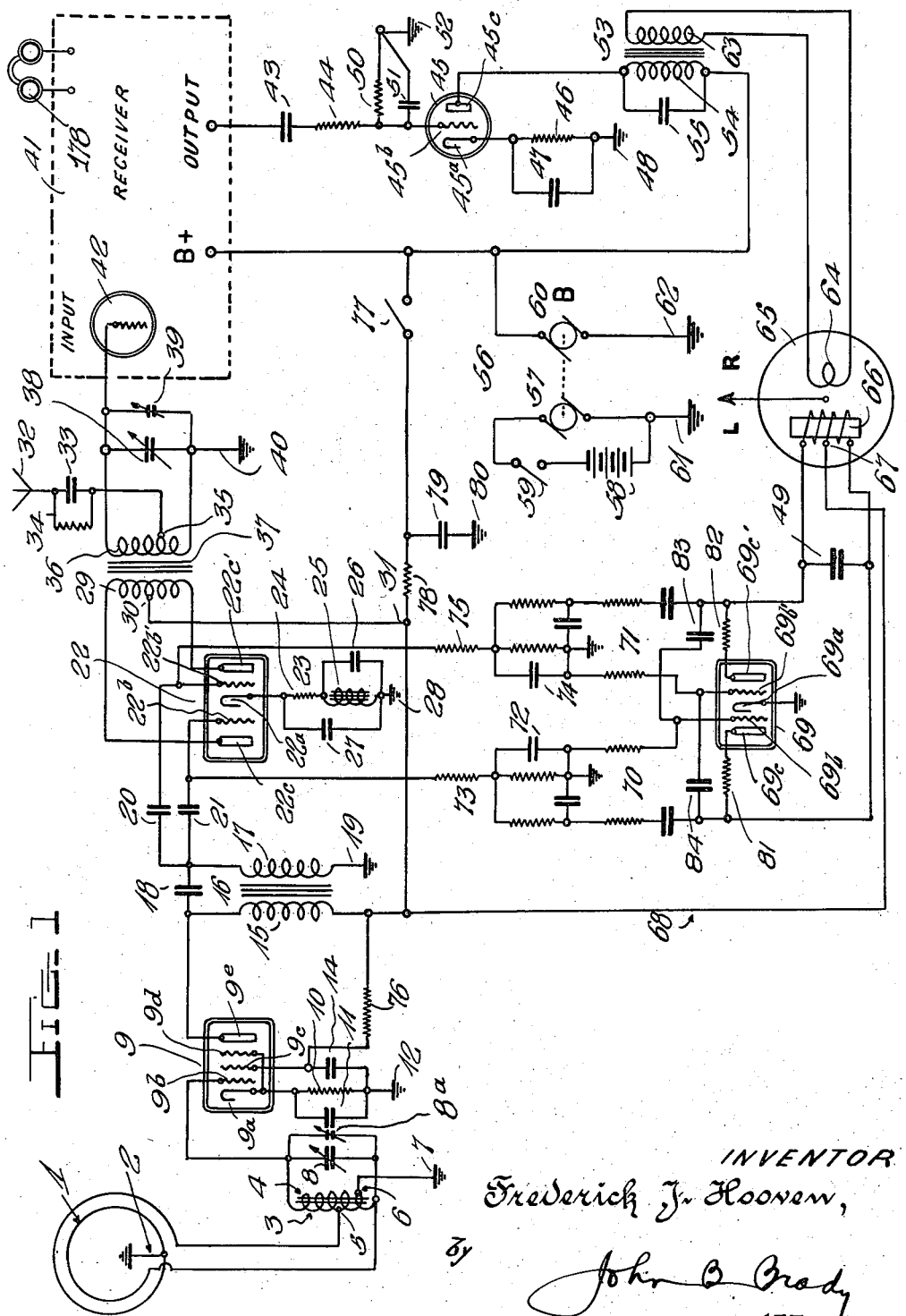
INVENTOR
Frederick J. Hooven,
by John B. Brady
Attorney

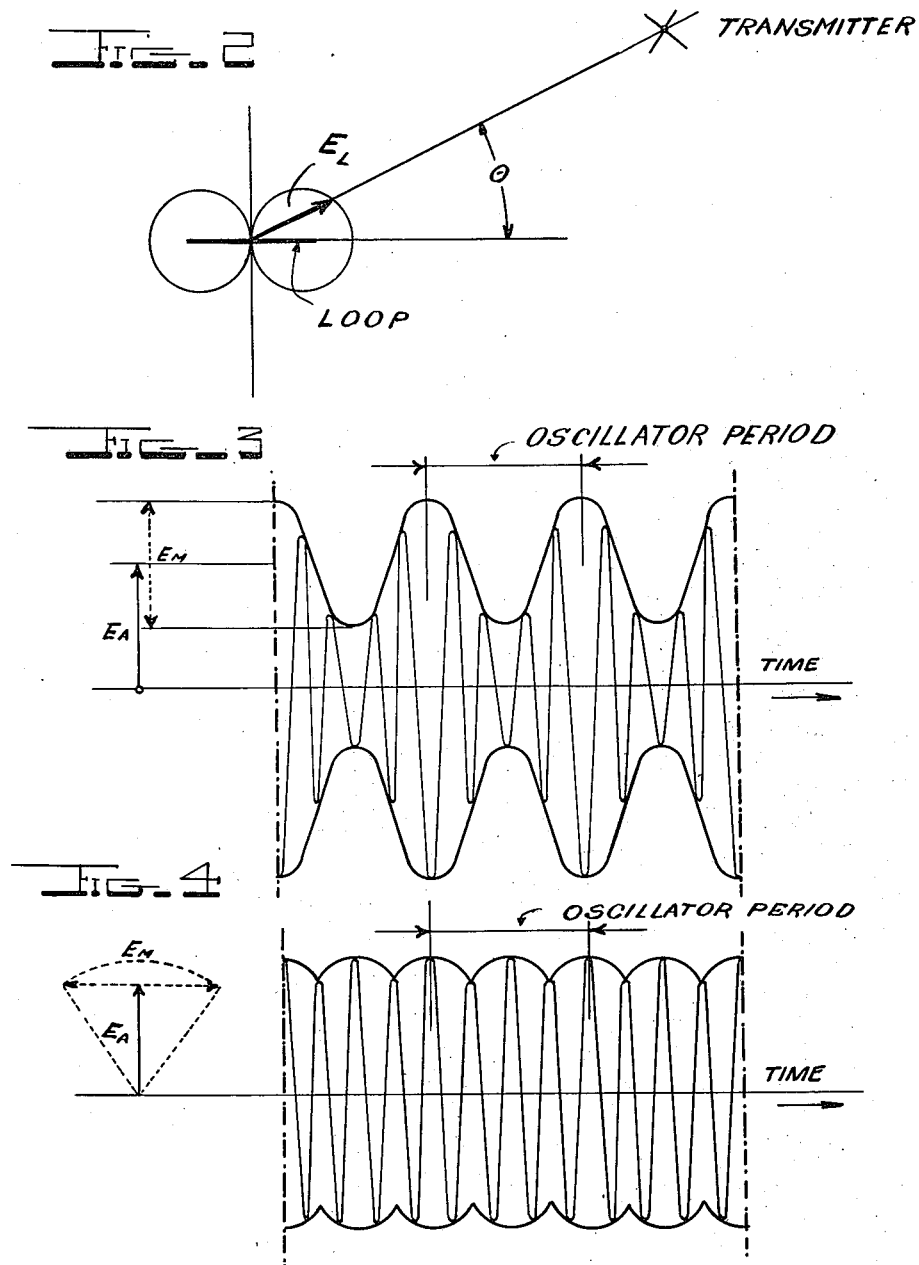

Patented June 16, 1942

2,286,804

UNITED STATES PATENT OFFICE 2,286,804

RADIO COMPASS

Frederick J. Hooven, Dayton, Ohio, assignor to Radio Corporation of America, New York, N. Y., a corporation of Delaware Application February 24, 1940, Serial No. 320,715

2 Claims. (Cl. 250—11)

My invention relates broadly to radio compasses and more particularly to an improved circuit arrangement for a radio compass of high precision characteristic.

One of the objects of my invention is to provide a radio compass system wherein misalignment of the radio frequency or the intermediate frequency circuit cannot produce a bearing error or a bearing reversal for thereby maintaining a high degree of efficiency and a high degree of precision in the operation of the radio compass system.

Another object of my invention is to provide a circuit arrangement for a radio compass in which any or all of the circuits of the compass may be mistuned to the limit of the trimmers without affecting the directional accuracy or sense of bearing of the radio compass.

Another object of my invention is to provide a radio compass system including both directional and non-directional circuits arranged to coact for operating an indicator wherein the energy received by the directional receiving circuit is amplified by a tube circuit and passed through a phaser circuit which presents a reactive impedance low in comparison with the resistance of the tube and hence produces a 90 degree phase difference between the grid and plate voltages of the tube circuit in the directional receiving circuit.

Still another object of my invention is to provide a radio compass circuit including a directional receiving system containing an amplifier and phaser wherein the phaser circuit is resonant at a frequency below the lowest band receivable on the directional receiving circuit whereby greater amplification is obtainable on the lower frequencies where the directional receiving circuit has the lowest pick-up efficiency.

A still further object of my invention is to provide an arrangement of radio compass circuit including a directional receiving system which operates into an amplifier, a phaser, and a modulator associated with an oscillator system and coupled with the non-directional receiving system which operates into the signal receiving circuit for controlling the indicator, in which the phaser presents a capacitive reactance to the signal and produces a 90 degree phase difference between the grid and plate voltages of the amplifier which phase difference is maintained by the coupling system between the output of the modulator and the signal receiving circuit.

Another object of my invention is to provide a radio compass system in which the directional receiving circuit includes an amplifier and a phaser connecting the modulator which is in turn coupled to the non-directional receiving circuit and signal receiving circuit, the phaser operating to predetermine the phase relationship between the current impressed from the directional receiving circuit with respect to the current supplied to the signal receiving circuit from the non-directional receiving circuit.

Still another object of my invention is to provide a radio compass circuit of high sensitivity in which an indicator responsive to the combined outputs of the signal receiving system and a local oscillator has an actuating coil system that constitutes part of the oscillatory system of the oscillator.

Other and further objects of my invention reside in the improved circuit arrangement for a radio compass as set forth more fully in the specification hereinafter following by reference to the accompanying drawings in which:

Figure 1 schematically shows the circuit arrangement of my invention; Fig. 2 is a polar diagram showing the variation of loop voltage with variation of angular position of the loop with respect to a distant transmitter; Fig. 3 is a theoretical diagram showing the manner in which the modulator signal component is added to the non-directional antenna component when the directional and non-directional signals are properly in phase; and Fig. 4 shows vector and curve diagrams indicating the effect of a 90 degree shift in either component with respect to the other.

I have illustrated the essential features of the circuit arrangement of the radio compass system of my invention although I have omitted parts of the circuit for the purpose of simplifying the explanation. For example, the signal receiving circuit which is connected with the non-directional receiving system includes a superheterodyne radio receiver containing both radio frequency and intermediate frequency circuits. The radio frequency and intermediate frequency circuits both contain tuning means and trimming means, a frequency converting tube, a heterodyne oscillator, a detector and automatic volume control circuits and also an audio frequency amplifier, the output of which connects to an indicator of the dynamometer type which is controlled from the oscillator which controls the modulator in the directional receiving circuit. The details of the signal receiving circuit have been omitted, but will be described generally for the purpose of completing the description of my invention.

My invention is directed to a radio compass circuit wherein misalignment of the radio frequency or intermediate frequency amplification circuits cannot produce a bearing error or a bearing reversal in the indicator reading. Any or all of the circuits may be mistuned to the limits of the trimmers without affecting the directional accuracy or sense of hearing—the only effect is a slight loss of sensitivity.

The signal receiving apparatus per se is of the superheterodyne type. The loop is a low-impedance center-tapped radio frequency energy pick-up coil of small diameter. The loop feeds a loop amplifier tube of high internal resistance in the plate circuit of which I provide a circuit which presents preferably a capacitive reactance to the signaling energy and hence produces a 90 degree phase difference between the grid and plate voltages of the amplifier circuit. The radio frequency signaling energy is then fed to the two grids of a double-triode modulator tube. These grids are normally biased to cut off and hence no signal passes. However, another double-triode tube used as a multivibrator audio oscillator, at a frequency of, for example, 48 cycles per second, is provided for conditioning the grids of the modulator. The audio frequency voltage from the oscillator is applied to the two grids of the modulator in opposite polarity and hence overcomes the cut-off bias on the grids alternately. Accordingly, the radio frequency signaling energy from the loop is passed alternately to the plate circuits of the double-triode modulator. The plates of the two triode modulator elements are connected in opposing polarity to a center-tapped coil which is coupled to a tuned coil to which is also coupled the non-directional antenna. The mixed signal is then amplified in two tuned radio frequency amplifier stages of the signal receiving system and then passed to a frequency converter tube, where it is mixed with heterodyne oscillations from an oscillator tube. The intermediate frequency signal which results has a carrier frequency of, for example, 112.5 kc. which is amplified in a single intermediate frequency amplifier and passed to a second detector and automatic volume control circuit and first audio frequency amplification stage. The automatic volume control action is applied to all radio frequency and intermediate frequency stages, and results in an output characteristic that is substantially independent of input voltage whenever that voltage exceeds a certain minimum. The second detector feeds an output tube for telephone receiver (aural) use, and another amplifier tube is connected to the audio frequency output of the last tube of the signal receiving system which constitutes the compass amplifier. The output of this amplifier is fed to the deflection coil of a dynamometer type meter, while the field current for the meter is derived directly from the oscillator described as operating at approximately 48 cycles per second. Two indicators can be readily accommodated directly from the compass amplifier output enabling the indicators to be mounted in different locations on the aircraft.

Referring to the drawings in detail, reference character 1 indicates the loop of the directional receiving circuit. The loop 1 is a low-impedance center-tapped coil grounded at 2. The transmission line extending from the loop 1 connects with a tuned circuit represented generally as constituted by inductance 3 and tuning condenser 8. Inductance 3 contains an iron core 4 and taps 5 and 6. The transmission line from loop 1 terminates at tap 5 and one end of inductance 3. A ground connection extends from tap 6 to ground 7, tap 6 being in the electrical center of that portion of inductance 3 included between the connections to the transmission line. The tuning condenser 8 tunes the inductance 3 and a trimmer indicated at 8a is provided for increasing the precision in tuning adjustments. The tuned circuit connects with the input of the loop amplifier. The loop amplifier is indicated at 9 as comprising a pentode tube including cathode 9a, control grid 9b, shield grid 9c, suppressor grid 9d, and anode 9e. The loop amplifier has a predetermined bias placed on control grid 9b through cathode resistor 10 and connected to ground at 12, the cathode resistor 10 being shunted by condenser 11. The shield grid 9c is connected through resistor 76 to the potential source and to ground by condenser 14. The output circuit of the amplifier 9 contains the phaser circuit of my invention constituted by the closely coupled transformer windings 15 and 17 wound upon iron core 16 and connected through condenser 18. Winding 17 is connected to ground at 19 and is connected at its opposite end through condensers 20 and 21 with the control grids 22b and 22b' of the modulator indicated at 22 and including cathode 22a, control grids 22b and 22b' and anodes 22c and 22c'. Control grids 22b and 22b' of modulator 22 are normally biased to very low plate current by means of the biasing circuits that I have indicated generally at 23. The biasing circuit includes cathode resistor 24 in circuit with the reactance 25 tuned by condenser 26, the entire combination being shunted by radio frequency by-pass condenser 27, and the combination connected to ground 28. The output circuit of the modulator 22 is connected through winding 29 with the input system of the signal receiving circuit. The winding 29 connects at one end to anode 22c and at the other end to anode 22c' of the modulator 22. The center-tap 30 of winding 29 is connected to the potential source through connection 31. The non-directional antenna is indicated at 32 connected to condenser 33 shunted by resistor 34 with tap 35 on winding 36 which is coupled through iron core 37 with the output winding 29 in the modulator circuit. The winding 36 connected to the non-directional antenna 32 is tuned by means of condenser 38 to the frequency of the received signal. Condenser 38 is shunted by a suitable trimmer indicated generally at 39 for securing precision adjustment and compensating for different antenna capacities. A connection is made to ground at 40 completing the non-directional antenna circuit. The signal receiving system is indicated generally at 41 and constitutes as heretofore explained, stages of tuned radio frequency amplification, the first of which I have indicated generally at 42, a frequency converter tube, in which the signal energy is mixed with heterodyne oscillations from an oscillator tube in the signal receiving circuit for deriving an intermediate frequency signal which is amplified and impressed upon a second detector including an automatic volume control circuit. The signal then passes through an audio frequency amplifier system, the output of which feeds both the visual and aural radio compass indicator circuit. I have shown the output of the audio frequency amplifier end of the signal receiving system connected to the amplifier tube 45 through coupling condenser 43 and a frequency discriminating or filter circuit constituted by condenser 51 and resistor 44 leading to the control grid 45b of the amplifier tube 45. The amplifier tube 45 includes cathode 45a, control grid 45b and anode 45c. Bias potential is obtained for control grid 45b through cathode resistor 46 shunted by condenser 47 connected to ground as indicated at 48. High resistance grid leak 50 is of high impedance at audio frequencies compared to condenser 51. The output of amplifier 45 includes the audio frequency transformer 53 having primary winding 54 connected in circuit with the anode 45c and tuned to the audio oscillator frequency by means of condenser 55. The potential supply for the audio frequency amplifier 45 and all of the high potential circuits of the receiver and radio compass is indicated generally by the dynamotor 56 consisting of motor 57 driven from battery 58 under control of switch 59 and coupled with generator 60 which supplies all of the high potential circuits of the apparatus. The dynamotor is a convenient source of supply for the radio compass system when operated upon aircraft as battery 58 indicates the direct current source available on the aircraft. The dynamotor circuit leading from motor 57 is grounded as indicated at 61 and the high potential circuit leading from generator 60 is grounded as indicated at 62. In this way all of the circuits herein described as being connected to ground are completed from the source of potential 60 through ground 62 and the several ground connections already enumerated. Audio frequency transformer 53 has the secondary winding 63 thereof connected to the moving coil 64 of the dynamometer type of indicating meter shown at 65. The indicating meter 65 is a right and left sense indicator giving to the pilot the exact position of the aircraft with respect to a distant transmitter. The dynamometer type of indicator includes a field winding 66 wound upon an electromagnetic core embracing in part the moving coil 64. The winding 66 has a center-tap 67 which connects to the source of potential 60 through the connection 68. The field winding 66 is tuned by condenser 49 to the desired audio oscillation frequency and its opposite ends are connected to the plates of the audio frequency oscillator tube indicated at 69 through resistors 81 and 82, and to the opposite grids of tube 69 by condensers 83 and 84. The oscillator 69 comprises cathode 69a, control grids 69b and 69b' and anodes 69c and 69c'. The frequency of the oscillator is controlled by the resonant frequency of the combination of the inductance of winding 66 and the capacity of condenser 49, and may be adjusted for low frequency operation, as for example, 48 cycles per second. The circuits indicated generally at 70 and 71 feed the audio frequency energy to the grids of the double-triode modulator 22. The circuits of the double-triode 69 connect to the double-triode modulator 22 as shown, extending through condensers 72 and resistor 73 to control grid 22b of the double-triode modulator and through condenser 74 and resistor 75 to control grid 22b' of the double-triode modulator 22. The two triode sections of tube 22 are so biased that only one section draws plate current at any one time while its grid has impressed on it a positive voltage from the oscillator 69. Consequently, the instantaneous polarity of the loop signal impressed on coil 29 is reversed during each half-cycle of the audio frequency voltage, inasmuch as the grids 22b and 22b' operate in like polarity with respect to radio frequency and the plates 22c and 22c' operate in opposite polarity with respect to coil 29. It should be noted that tube 22 need not necessarily be biased to cut-off in the absence of modulator voltage, for in such an instance or during the instant when the oscillator voltage passes through zero the two tube sections will have equal and opposing conductance and no resultant signal current will flow in coil 29. The mixed signal is then amplified in the radio frequency amplifier stages of the signal receiving system and associated parts of the signal receiving system for operating the indicator 65 as heretofore explained. The power supply circuit for the several tubes has been generally explained and it will be understood that resistors may be interposed in various parts of power supply circuit for obtaining the desired potential for the various electrodes of the tubes employed. For example, resistor 76 in the screen grid circuit of the loop amplifier tube provides a positive potential for operation of the loop amplifier. Switch 77 in the power distribution circuit is normally closed when the apparatus is operated as a radio compass. If it is desired to disconnect the directional receiving circuit from the non-directional receiving circuit for operation of the signal receiving circuit for communication purposes or for radio range purposes without the directional characteristic, switch 77 may be opened and the signal receiving circuit 41 operated independently of the directional receiving system for operation of an aural receiving device, such as telephone headset indicated generally at 178.

In order to prevent variations in the output current in the loop amplifier 9 or the modulator 22 or the oscillator 69 from impressing any degree of similar variation from the source of potential 60 upon the signal receiving circuit of the signal receiving system 41, I provide a filter system in the power distribution circuit between the signal receiving system and the loop amplifier, the modulator, and the oscillator as indicated by resistor 78 and condenser 79 connected to ground 80. Resistor 78 and condenser 79 are selected of such values that they coact to limit the flow of alternating current from the modulating source 22 to the indicator 65 through the common source of potential 60, for thereby reducing the undesirable combined effects of variations of such current in the indicator. That is to say, the filter 78-79, functions to eliminate any alternating current of audio oscillator frequency from reaching the indicator moving coil by way of the power supply circuit from the modulator or the oscillator, thus causing a false indication of the indicator, whereby increasing and preserving the precision operation of the apparatus of my invention.

The general theory of operation of this type of radio compass is more thoroughly dealt with in my copending application 63,663, filed February 12, 1936.

The received signal is received by non-directional antenna 32, whose capacity forms a part of the tuned circuit also constituted by coil 36 and condensers 33, 38 and 39, so that the component of signal voltage impressed on grid 42 is substantially in phase with the signal voltage field when the tuned antenna circuit is properly tuned to the signal.

The directional antenna 1 induces across coil 3 and thus impresses on grid 9b a component of the signal voltage which is 90 degrees out of phase with the signal voltage field when the system constituted by coil 3, loop 1 and condensers 8 and 8a is tuned to the frequency of the received signal. The directional antenna signal varies in amplitude with the angle of the plane of the loop to the line toward the transmitting station, and, as is well known to those familiar with such antennae, is zero when the plane of the loop is at 90 degrees to such a line. In Fig. 2 is shown the polar diagram of the loop voltage with variation in this angle, which relationship may be expressed as $E_L \propto E_s \cos \theta$, where
$E_L$ = loop signal voltage
$E_s$ = signal voltage field
$\theta$ = angle between plane of loop and line toward transmitter It may be observed, then, that through one-half circle of rotation of the loop with respect to the location of the transmitter the voltage on grid 9b will lead the voltage on grid 42 by 90 degrees and through the other half of the circle of rotation of the loop the voltage on grid 9b will lag that on grid 42 by 90 degrees.

Tube 9 is purposely chosen for its high plate internal resistance, in the example preferred being a pentode whose internal resistance is almost infinite. The output circuit transformer 16 having a natural resonance outside the band of frequencies which the system is designed to receive presents a reactive impedance to the plate circuit of tube 9. It is preferable for reasons explained below that transformer 16 be resonant at a frequency lower than the band to be received but it may also be resonant above this band. Since the internal impedance of the tube 9 is very high compared to the reactance across transformer 16, the voltage across the reactance will be 90 degrees out of phase with the voltage on grid 9b, and the voltage impressed on grids 22b and 22b' will likewise be 90 degrees out of phase with the voltage on grid 9b.

The condensers 20 and 21 are so proportioned that they have low impedance at radio frequencies in comparison with resistors 73 and 75 so that substantially no radio frequency voltage drop occurs across condensers 20 and 21. Likewise, at the very low frequency of the audio oscillator, the condensers 20 and 21 present a very high impedance so that grids 22b and 22b' have impressed on them both the radio frequency voltage from transformer 16 in the same phase, and the audio frequency voltage from oscillator 69 in opposing phase.

Thus the two triode sections of tube 22 function alternately as amplifiers, the grid 22b being positive with respect to ground while the grid 22b' is negative for one-half the audio cycle, and vice versa for the other half cycle. The resistance 23 is so chosen that the cathode 22a is maintained positive to ground by an amount exceeding the maximum positive voltage swing on the grids and equalling approximately the cut-off bias of the tube. Thus, when either grid is negative with respect to ground that side of the tube does not function as amplifier, while the other side does for a half cycle of the audio frequency oscillator voltage. Likewise, the plates 22c and 22c' are coupled in opposing phase relation through coil 29 to the tuned coil 36 and to grid 42 of the receiver. Consequently, since each half of the double tube 22 induces in coil 36 a signal of opposite phase to that induced by the other half, it follows that for one-half cycle of the audio oscillator frequency the signal induced in coil 36 will be of one phase angle and for the other half of the audio cycle it will be the opposite phase.

Since the loop component of the signal is shifted through 90 degrees as described, it follows that the voltage induced in coil 36 by the loop signal will either be in phase with the nondirectional antenna voltage or exactly opposite, during successive audio half-cycles. This is to say, that the loop signal augments the antenna signal during one-half cycle and reduces it the other half cycle, resulting in a modulation of the two added, or mixed, components by the frequency of the audio oscillator. It is also at once apparent that the phase and magnitude of this modulation change in accordance with the phase and magnitude of the loop signal.

The function of the resistor condenser filter shown at 70 and 71 is to reduce the full oscillator output voltage to that desired on the grids of modulator 22, and also to change the phase angle through 90 degrees in order that this phase angle be in phase with the current through coil 66. By tuning coil 66 and using it as the oscillator tuned circuit it is insured that the current through coil 66 bears a constant relationship to the audio voltage on grids 22b and 22b', also, by using coil 66 as the oscillator tuning inductance the weight, bulk, and expense of a separate coil are avoided.

When the modulated signal is amplified and detected by receiver 41, a voltage of oscillator frequency is impressed on the coil 64 of indicator 65 by way of amplifier 45. The relative polarity between the resulting oscillator frequency current in coil 64 and that in coil 66 is dependent on the relative polarity of the signal voltage in the loop and consequently on the direction of the loop transmitter line. The resistance condenser filter constituted by resistor 44 and condenser 51 is primarily for the purpose of suppressing other audio voltages resulting from transmitter modulation, inasmuch as any odd harmonic of the oscillator frequency impressed on coil 64 will cause a spurious motion of the indicator.

Other circuit characteristics of incidental value are shown in Fig. 1, such as the degenerative modulator balancing circuit constituted by inductance 25 and condenser 26, tuned to the oscillator frequency. If, as often happens, one of the triode elements of the tube 22 happens to have a greater mutual conductance than the other, it will tend to draw more plate current when that portion of the tube is functioning as amplifier, i. e., when that grid is more positive. The impedance of the parallel resonant circuit shown at 25—26 being very high at the oscillator frequency, the cathode is allowed to follow the stronger grid positive, thus providing a degenerative increase in the bias of the stronger section of the tube with a corresponding decrease in the bias of the weaker section. In this way it is possible to maintain modulator balance without adjustment despite large random variations in tube characteristics. At the same time the cathode circuit is maintained at low impedance at other frequencies so that excessive degeneration does not occur.

The filter circuits shown at 70 and 71 not only serve to lower the voltage and change the phase of the oscillator component, but also discriminate against higher frequencies and harmonics, thus improving wave form and performance.

I have indicated that I prefer to have the primary 15 of transformer 16 tuned to a capacitative reactance over the useful band, i. e. resonant at a lower frequency than it is desired to receive. This is because the usual loop antenna is more responsive to higher frequencies than low, and the reverse is true of the amplifier 9 if a capacitative reactance is present in its plate circuit, thus providing a useful means for levelling the output of the combined circuits over a wide range.

I have shown how the radio compass of my invention operates when it is properly adjusted, but since one of its most important advantages is its ability to perform in spite of being maladjusted, I will show the effects of maladjustment.

In Fig. 3, I show the diagram in which the modulator signal component $E_M$ is added to the non-directional antenna component $E_A$, the two components being exactly in the same line of phase. This is the ideal case where the loop is correctly tuned, and then shifed through 90 degrees relative to the antenna signal before the two are mixed.

In Fig. 4, I show the effect of a 90 degree shift in either component, with respect to the other. There is no amplitude modulation at the oscillator frequency, and no operation as a radio compass.

If the relative phase shift of the two components exceeds 90 degrees then operation is resumed, but indications are exactly opposite to what they are with normal alignment. For a navigation device, to which men trust their lives, no error could be worse than one which is 180 degrees wrong, and a radio compass known to have a 180 degree uncertainty is far preferable to one which has such uncertainty, but seems not to.

By proportioning the coil 29 so that its resonant frequency with the associated capacities of the tube anodes 22c and 22c' is without the tuning range of coil 36 and condensers 38 and 39, and arranging coil 29 relative to coil 36 so that the coupling remains above or below the critical value throughout said tuning range, (I have found that close coupling is desirable, and have shown to that end the iron core 37), the coupling constants between the coil 29 and the tuned impedance 36—38—39 are so chosen that the change in impedance caused by any mistuning of this circuit causes a phase shift of the output component of the modulator exactly equal to that phase shift of the antenna component caused by the same change of impedance. It therefore follows that any phase relationship between the modulated directional signal and the unmodulated non-directional signal is unaffected by any possible mistuning of the antenna circuit. It is true that a misalignment of the antenna circuit will reduce the intensity of both the directional and non-directional signals, but the relative intensity of the two signals is not affected thereby and the only result of such mistuning is a reduction in the maximum sensitivity of the compass.

Inasmuch as the loop antenna operates by virtue of the magnetic component of the received signal and the antenna operates by virtue of the electric field of the received signal, the voltage across the loop, when tuned, will be 90° out of phase with the voltage across the antenna system when tuned. Inasmuch as the antenna system itself, coil 36 and its associated tuning condensers 38 and 39 along with the antenna 32 constitute also the output circuit of modulator 22, the voltage induced across coil 36 by the modulator 22 will be in phase with the voltage impressed on the grids of modulator 22, when the antenna system is tuned. It can therefore be stated with certainty that if the phase of the loop component of the signal is shifted through 90° by means of amplifier 9 and its associated reactive output circuit, coils 15 and 16, then the input voltage on the grids of modulator will be in phase with the electric field of the signal when the loop is tuned. Likewise, since the loop component and antenna component are shifted equally by any mistuning of the antenna circuit, as explained in the preceding paragraph, it follows that the coincidence of these two components in phase as they appear combined in coil 36 is unaffected by any mistuning of the antenna circuit. When the loop circuit is mistuned the voltage across the loop is caused to lead or lag the magnetic component of the signal by not more than 90°.

When this occurs the modulator output component induced in coil 36 will then lead or lag the antenna component by not more than 90°. Since it is necessary to change the relative phase angle of these two components by more than 90° to obtain a reversal of indication, it may be stated that in the circuit of my invention as described herein and in part in my co-pending application 63,663, supra, it is impossible to cause a reversal of indication by any mistuning of the circuits of the radio compass or its associated circuits. It is noted that extreme mistuning of the loop circuit will cause a 90° divergence of the loop and antenna components of the voltage in coil 36, which will cause the compass to become inoperative, but this is a condition which, although undesirable, is not misleading.

Also, as pointed out in my application 63,663, the loop circuit is one in which all the reactances are a part of the compass itself, and constitute a shielded and protected circuit not likely to become disturbed by outside influences, whereas the antenna is normally a mast or wire installed as part of the aircraft itself, for which proper compensation within the compass can only be achieved after installation in the aircraft, and which is more susceptible to change in its capacitance through the accumulation of ice or by mechanical disturbance. Although mistuning of the circuits of the receiver 41 is likely to occur, any phase shift which occurs to affect the loop and antenna components after they have been added together has no effect on the directional accuracy of the compass. It should be noted that this advantage is only obtained by the combined use of my inventions described herein and in my application 63,663, supra for if it were possible to vary the phase of the antenna component of the signal even slightly relative to the modulator component it would then be possible to cause a reversal of sense by compounding variations of both loop and antenna components.

A radio compass is a complicated device, and when used in aircraft service is unavoidably subject to occasional derangement. At the same time its usefulness to the operator of an aircraft is only as great as that operator's faith in its veracity. By designing a radio compass that cannot be inadvertently or accidentally reversed, I have therefore made a great practical contribution to the useful art of air navigation.

While I have described my invention, in certain of its preferred embodiments, I desire that it be understood that modifications may be made and no limitations upon my invention are intended other than may be imposed by the scope of the appended claims.

What I claim as new and desire to secure by

Letters Patent of the United States is as follows:

1. In a radio compass system, a directional antenna, a vacuum tube oscillator, a modulator responsive to the combined outputs of said directional antenna and said vacuum tube oscillator, a non-directional antenna, a receiver responsive to the combined outputs of said non-directional antenna and said modulator, an indicator responsive to the combined outputs of said receiver and said vacuum tube oscillator, said indicator including a tuned coil which forms the frequency determining circuit for said vacuum tube oscillator.

2. In a radio compass system, a directional antenna, a vacuum tube oscillator, a modulator responsive to the combined outputs of said directional antenna and said vacuum tube oscillator, a non-directional antenna, a receiver responsive to the combined outputs of said non-directional antenna and said modulator, an indicator responsive to the combined outputs of said receiver and said vacuum tube oscillator, said indicator including a tuned coil which forms the oscillatory circuit for said vacuum tube oscillator.

FREDERICK J. HOOVEN.